United States Patent
Zhang et al.

(10) Patent No.: US 9,504,119 B2
(45) Date of Patent: Nov. 22, 2016

(54) LED DRIVER HAVING SHORT CIRCUIT PROTECTION

(71) Applicant: Self Electronics Co., Ltd., Ningbo, Zhejiang (CN)

(72) Inventors: Ruomeng Zhang, Zhejiang (CN); Huangfeng Pan, Zhejiang (CN); Xuhong Ma, Zhejiang (CN); Junjun Ying, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/065,273

(22) Filed: Mar. 9, 2016

(65) Prior Publication Data

US 2016/0270185 A1    Sep. 15, 2016

(30) Foreign Application Priority Data

Mar. 10, 2015 (CN) .......................... 2015 1 0103140

(51) Int. Cl.
*H05B 33/08* (2006.01)

(52) U.S. Cl.
CPC ...... *H05B 33/0887* (2013.01); *H05B 33/0815* (2013.01); *H05B 33/0845* (2013.01)

(58) Field of Classification Search
CPC .. H05B 37/02; H05B 33/08; H05B 33/0815; H05B 33/0842; H05B 33/0845; H05B 33/0884; H05B 33/0887
USPC ..... 315/209 R, 210, 224–226, 291, 307, 308
See application file for complete search history.

(56) References Cited

U.S. PATENT DOCUMENTS 8,111,017 B2 * 2/2012 Lin .................... H05B 37/0263
                                                            315/209 R

* cited by examiner

*Primary Examiner* — Jimmy Vu
(74) *Attorney, Agent, or Firm* — Wang Law Firm, Inc.

(57) ABSTRACT

An LED driver having short circuit protection includes a power, a controlling module coupled to the power and be configured to control output thereof, a sampling module electrically connected to the controlling module, a switch controlling module coupled to the sampling module, and a second switch coupled to the switch controlling module 40 and the output end of the power. The controlling module includes a first switch. The sampling module gets a low level signal during that short circuit is occurred in the first switch. When the switch controlling module receives the low level signal, it turns off the second switch so as to reduce the input voltage of the controlling module. The LED driver having short circuit protection can protect the first switch and load during that short circuit is occurred in the first switch.

10 Claims, 4 Drawing Sheets

LED DRIVER HAVING SHORT CIRCUIT PROTECTION

RELATED APPLICATION

This present application claims benefit of the Chinese Application, CN201510103140.6, filed on Mar. 10, 2015.

BACKGROUND

1. Technical Field

The present application relates to lighting source driver circuits, and more particularly to an LED driver having short circuit protection to protect against output short conditions.

2. Description of the Related Art

Light emitting diode (LED) is growing in popularity due to decreasing costs and long life compared to incandescent lighting and fluorescent lighting. LED lighting can also be dimmed without impairing the useful life of the LED light source.

Isolated constant current source topologies that are commonly used in light source (e.g., LED) driver circuits includes flyback converters, forward converters, LLC converters, and half-bridge isolated buck converters. Flyback converters and forward converters have low efficiency and require the use of high-voltage MOSFET devices. LLC converters have insufficient output voltage range, and the output is not self-limiting. Half-bridge isolated buck converters require hard switching of the MOSFET devices, have low efficiency, require complicated controllers, and the output is not self-limiting.

Referring to FIG. 4, an LED driver is shown in prior art. The LED driver provides current having certain duty cycle for the LED. The current is outputted by a controlling module N1 under the control of the switch Q1 which is high frequently turned on or turned off. Because of over-voltage, static, high temperature, and so on, it is ease to damage the switch Q1. When the switch Q1 is out of operation, it will lose the switch function and equal to a wire. As a result, short circuit is occurred, and the output current of the LED driver is directly dropped across the LED so that the LED is burned as it works under of the over-voltage or over-current.

Therefore, it is necessary to provide an LED driver having short circuit protection for settling out the above art problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this application are not necessarily to the same embodiment, and such references mean at least one.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

Figure 1:
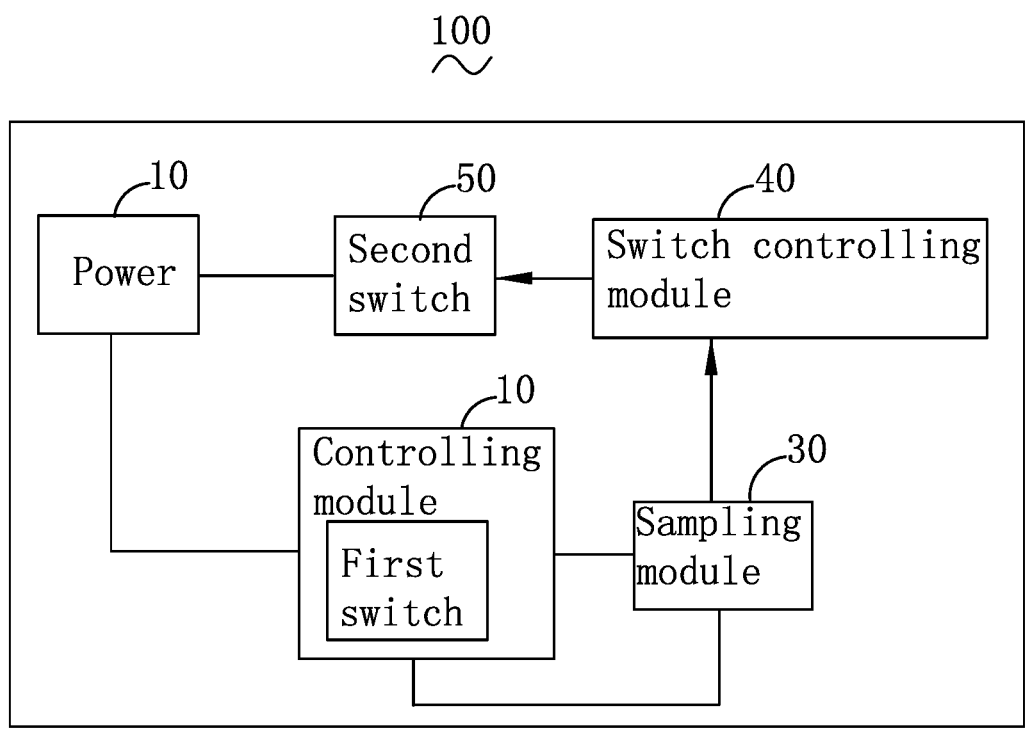
FIG. 1 is a block diagram of an LED driver having short circuit protection according to a first embodiment.
Figure 2:
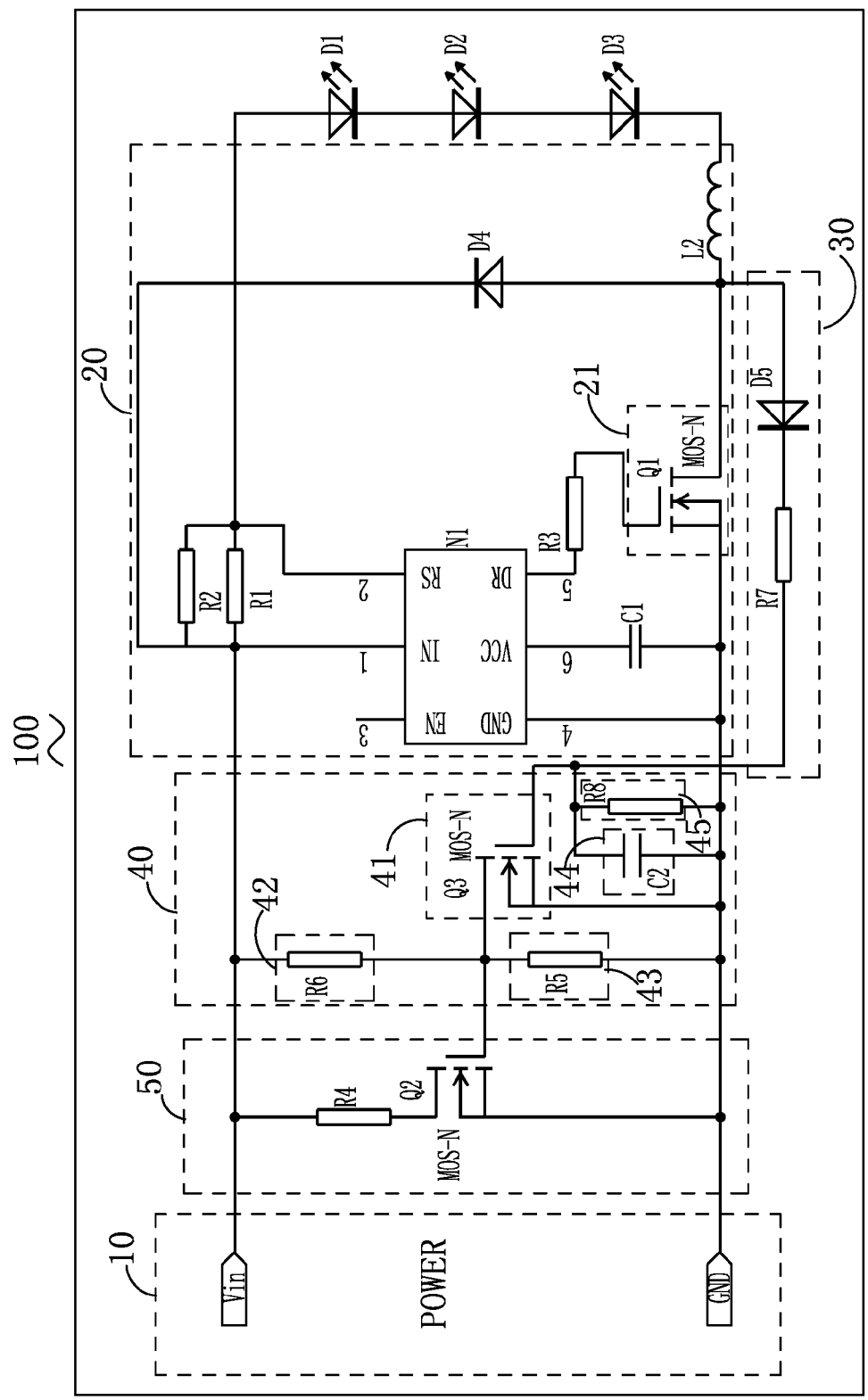
FIG. 2 is a schematic diagram of the LED driver having short circuit protection of FIG. 1.

Referring to FIG. 1 and FIG. 2, an LED driver 100 having short circuit protection according to a first embodiment is shown. The LED driver 100 having short circuit protection includes a power 10, a controlling module 20 coupled to the power 10 and be configured to control output thereof, a sampling module 30 electrically connected to the controlling module 20, a switch controlling module 40 coupled to the sampling module 30, and a second switch 50 coupled to the switch controlling module 40 and the output end of the power 10. LED loads can be coupled to the output ends of the controlling module 20 of the LED driver 100 having short circuit protection which provides power to the LED loads.

The power 10 is used to electrically connected to the grid and to output power for post-stage circuit after step-down, rectifying, and filting. It is well known that the power 10 may include converter for changing outputted voltage range, and some function module, e.g. rectifying module, filter module, and so on. In the first embodiment, the power 10 is coupled to the grid and outputs given voltage value to the controlling module 20 after step-down, rectifying, and filting. Further, the power 10 is a constant voltage power having a function of short circuit protection. The constant voltage power can reduce or cut off output value during short circuit so as to protect the post-stage circuit. In the power 10, the specific electron components used therein and connecting way thereof are well known for a person skilled in the art. Therefore, it is not necessary to describe them in detail.

The controlling module 20 includes a first switch 21. It may be understood that the controlling module 20 further a controlling module N1. The controlling module N1 is configured for controlling the on/off of the first switch 21 according to a duty cycle signal. In the first embodiment, the controlling module N1 is a DC-to-DC chip which converts direct voltage into direct current. And it has a BUCK-type step-down circuit which is cooperation with the DC-to-DC chip. The first switch 21 is electrically connected to the LED load so as to provide voltage or current having certain duty cycle for the LED load. The first switch 21 may be an electron switch having a threshold voltage, such as a metal oxide semiconductor (MOS), a triode, and so on. In the first embodiment, the first switch 21 is an N-channel metal oxide semiconductor Q1. A drain terminal of the N-channel metal oxide semiconductor is coupled to the sampling module 30, a source terminal is electrically connected to an cathode of output ends of the power 10, and a gate terminal is coupled to the controlling module N1. During short circuit of the N-channel metal oxide semiconductor the voltage value of the gate terminal thereof is same as that of the source terminal, namely is equal to the cathode voltage value of the power 10. In result, the sampling module 30 will sample a voltage signal having a low level signal. Therefore, the voltage signal sampled by the sampling module 30 from the first switch 21 is a low level signal during the first switch 21 is out of work because of short circuit. As well known, the short circuit may be occurred because of over-voltage, static, high temperature, and so on, which result in damage of the first switch 21. Another condition, when the controlling module N1 is failure and has not output the duty cycle signal and the first switch 21 always opens, the voltage signal sampled by the sampling module 30 from the first switch 21 is a low level signal.

The sampling module 30 is electrically connected to the first switch 21 and is configured for sampling voltage signal therefrom. The sampling module 30 outputs low level signal while short circuit is occurred in the first switch 21. The sampling module 30 includes a sampling resistor 31 electrically connected to the first switch 21. The resistance of the sampling resistor 31 may need to meet the signal intensity of the switch controlling module 40. The sampling resistor 31 steps down the output voltage of the first switch 21 and provides level signal to the third switch 41. In the first embodiment, the sampling resistor 31 is the resistor R7 in FIG. 2. Furthermore, the sampling module 30 includes a diode 32 which is configured to avoid from inversely connecting. An anode of the diode 32 is electrically connected to the first switch 21, and a cathode of the diode is electrically connected to the sampling resistor 31. The diode 32 is configured for preventing voltage signal from inversely flowing into the first switch 21 so as to reduce accuracy of the voltage signal sampled by the sampling module 30. In the first embodiment, the diode 32 is a diode D5 in FIG. 2. An anode of the diode D5 is coupled in parallel to the drain terminal of the N-channel metal oxide semiconductor Q1, and a cathode of the diode D5 is coupled to the resistor R7 of the sampling module 31.

The switch controlling module 40 is electrically connected to the sampling module 30 and is configured to turn on or turn off the second switch 50 so as to reduce the input voltage value of the controlling module 20. The switch controlling module 40 may adopt a single chip microcomputer or conventional circuit to turn on or turn off the second switch 50 when it receives a low level signal. The switch controlling module 40 includes a third switch 41. The third switch 41 is configured to turn off the second switch 50 when it receives a low level signal and turn on the second switch 50 when it receives a high level signal. The third switch 41 may be a electron switch, such as metal oxide semiconductor, triode, and so on. Further, the switch controlling module 40 includes a first divider resistor 42 coupled in parallel to the second switch 50, and a second divider resistor 43 coupled in series to the first divider resistor 42. The first, second divider resistor 42, 43 is configured for reducing the output voltage of the power 10 so as to provide a right threshold voltage for the second switch 50. Furthermore, the switch controlling module 40 includes a filter capacitor 44 coupled to the third switch 41, and a discharge resistor 45 coupled in parallel to the filter capacitor 44 and electrically connected to the sampling module 30. The filter capacitor 44 is configured to provide regulated threshold voltage for the third switch 41 during the first switch 21 is in normal work. One end of the filter capacitor 44 and the discharge resistor 45 is electrically connected to a gate terminal of the N-channel metal oxide semiconductor of the third switch 41 and another end thereof is electrically connected to the cathode of the power 10. The discharge resistor 45 is configured to discharge the filter capacitor 44 during that short circuit is occurred in the first switch 21 so that the third switch 41 is turned off since voltage value loaded on the gate terminal thereof is drop quickly. As shown in FIG. 2, the first divider resistor 42 is resistor R6, and the second divider resistor 43 is resistor R5 in the first embodiment. And the filter capacitor 44 is capacitor C2, and the discharge resistor 45 is resistor R8.

The second switch 50 is electrically connected to the switch controlling module 40 and the output end of the power 10 respectively and is controlled by the switch controlling module 40. In the first embodiment, the second switch 50 is coupled in parallel to two output ends of the power 10. It may be well understood that the switch controlling module 40 further includes a current limiting resistor R4. The current limiting resistor R4 is coupled in parallel to the second switch 50 and is configured for avoiding current larger than regulated current from flowing through the second switch 50. In the first embodiment, the second switch 50 is an N-channel metal oxide semiconductor Q2. A drain and source terminals of the N-channel metal oxide semiconductor Q2 is coupled respectively to the output ends of the power 10. A gate terminal of the N-channel metal oxide semiconductor Q2 is electrically connected between the first divider resistor 42 and the second divider resistor 43.

When short circuit is occurred in the first switch 21, that is to say, in the N-channel metal oxide semiconductor in the first embodiment, the voltage value between the drain terminal and source terminal of the N-channel metal oxide semiconductor is zero. Therefore, the sample module 30 gets a low level signal and supplies the low level signal for the third switch 41 of the switch controlling module 40. The third switch 41, namely N-channel metal oxide semiconductor, is turned off under the low level. As a result, the second divider resistor 43 is electrically connected to the second switch 50 and supplies the threshold voltage for the second switch 50. When the second switch 50 is turned on, short circuit is occurred in the output ends of the power 10. In result, the constant voltage power 10 having a function of short circuit protection can reduce or cut off output value during short circuit so as to protect the post-stage circuit. Conversely, when the first switch 21 is in normal work, the sampling module 30 gets a high level signal and the third switch 41 is turned on. As a result, short circuit is occurred in the first divider resistor 42 so that the second switch 50 is turned off. Therefore, the power 10 will be in normal work.

As described above, when short circuit is occurred in the first switch 21 of the LED driver 100 having short circuit protection, the sampling module 30 gets a low level signal outputted from two ends of the first switch 21 and provides the low level signal to the switch controlling module 40. As a result, the second switch 50 is turned off by the switch controlling module 40 so as to reduce the input voltage of the controlling module 20. Therefore, the LED driver 100 having short circuit protection can reduce the outputted voltage value via reducing the input voltage of the controlling module 20 during short circuit is occurred in the first switch 21. As a result, the current value flowing through the first switch 20 is reduced so as to avoid the first switch 21 from damaging, and the LED loads are burned because of large output voltage.

Figure 3:
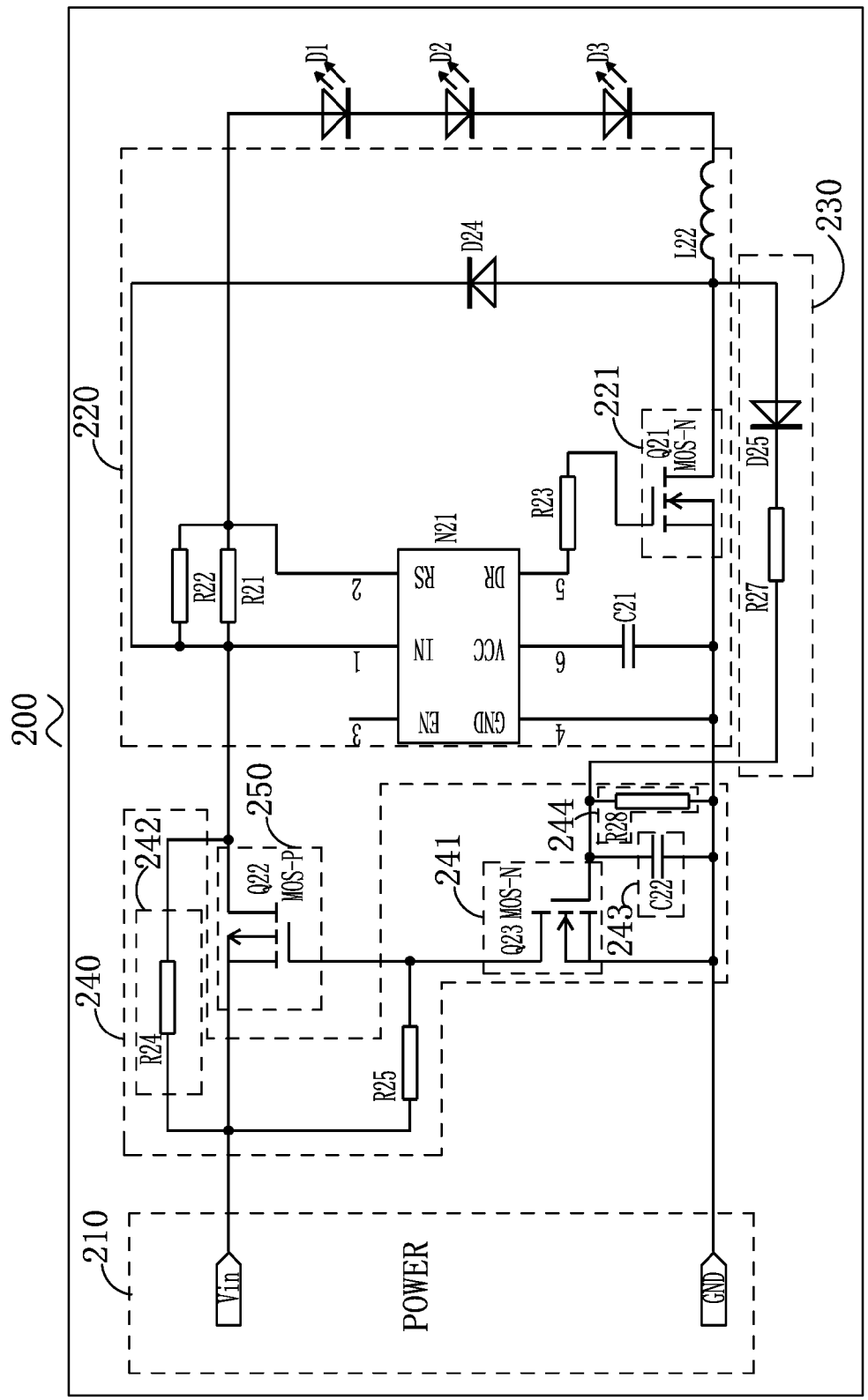
FIG. 3 is a schematic diagram of the LED driver having short circuit protection according a second embodiment.

Referring to FIG. 3, an LED driver 200 having short circuit protection according to a second embodiment is shown. The LED driver 200 having short circuit protection includes a power 210, a controlling module 220 coupled to the power 210 and be configured to control output thereof, a sampling module 230 electrically connected to the controlling module 220, a switch controlling module 240 coupled to the sampling module 230, and a second switch 250 coupled to the switch controlling module 240 and the output end of the power 210.

The differences between the second embodiment and the first embodiment is that the power 210 has no short circuit protection function. The power 210 may be a constant voltage power, such as a LED switch driver, a battery, and so on.

The controlling module 220 and the sampling module 230 in the second embodiment have same electron components and connecting way thereof with the controlling module 20 and the sampling module 30 in the first embodiment.

Figure 4:
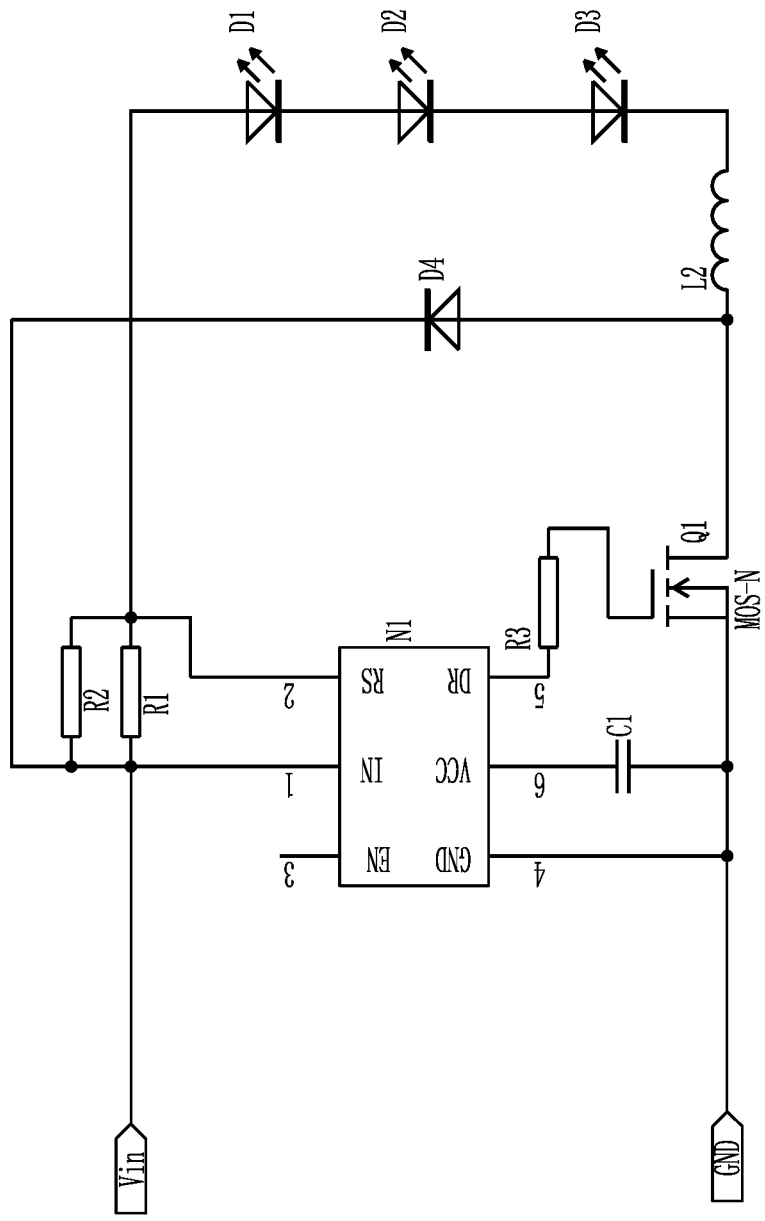
FIG. 4 is a schematic diagram of an LED driver in prior art.

The switch controlling module 240 is partially identical to the switch controlling module 40 in the first embodiment and includes a third switch 241, a filter capacitor electrically connected to the third switch 241, and a discharge resistor 244 coupled in parallel to the filter capacitor 243. Comparing with the first embodiment, the switch controlling module 240 further includes a current limiting resistor 242 coupled in parallel to the second switch 250. In second embodiment, the third switch 241 is a N-channel metal oxide semiconductor, the current limiting resistor 242 is a resistor R24, the filter capacitor 243 is a capacitor C22, and the discharge resistor is a resistor R28 as shown in FIG. 4. The third switch 241 is electrically connected to the sampling module 230 and the second switch 250 respectively. The third switch 241 is turned off when it receives a low level signal so as to turn off the second switch 250. As a result, the current limiting resistor 242 is coupled in series to the power 200 in order to reduce the input voltage of the controlling module 220. It may be understood that the second switch 250, namely the following P-channel metal oxide semiconductor, is electrically connected to a resistor R25 for ensuring to turn off the second switch 250. Further, the resistor R25 is coupled between the source terminal and the gate terminal of the P-channel metal oxide semiconductor. When the third switch 241 is turned off, it is equal to a resistor having an infinite resistance and electrically connected in series to the resistor R25. In result, voltage value loaded on the resistor R25 is very small and is less that the threshold voltage of the second switch 250.

The second switch 250 is coupled in series to the anode of the output ends of the power 200. In the second embodiment, the second switch 250 is a P-channel metal oxide semiconductor Q22. The drain terminal of the P-channel metal oxide semiconductor Q22 is electrically connected to the anode of the output ends of the power 200, the source terminal thereof is electrically connected to the controlling module 220, and the gate terminal thereof is electrically connected to the third switch 241.

As described above, when short circuit is occurred in the first switch 221 of the LED driver 100 having no short circuit protection, the sampling module 230 gets a low level signal and provides the low level signal to the third switch 241 of the switch controlling module 240. As a result, the second switch 250 is turned off as the third switch 241 is turned off during the low level signal is loaded thereon. Finally, the current limiting resistor 242 is coupled in series to the power 200 in order to reduce the input voltage of the controlling module 220. Conversely, when the first switch 221 is in normal work, the sampling module 230 gets a high level signal and the third switch 241 is turned on. As a result, the voltage loaded on the gate terminal of the P-channel metal oxide semiconductor step down and the second switch 250 is turned on. Therefore, short circuit is occurred in the current limiting resistor 241 so that the power 10 will be in normal work.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LED driver having short circuit protection, comprising:
    a power;
    a controlling module coupled to the power so as to control output current of the LED driver, the controlling module comprising a first switch;
    a sampling module coupled to the first switch and configured to sample the output voltage of the first switch, the sampling module outputting low level signal during short circuit
    a switch controlling module coupled to the sampling module, and;
    a second switch coupled to the output terminal of the power and the switch controlling module and be controlled by the switch controlling module, the switch controlling module turning off the second switch so as to reduce the input voltage of the controlling module when the switch controlling module receives the low level signal.

2. The LED driver having short circuit protection as claimed in claim 1, wherein the switch controlling module comprises a third switch, the third switch is turned on during the sampling module low level signal and is turned on during high level signal.

3. The LED driver having short circuit protection as claimed in claim 2, wherein the second switch is coupled in parallel to the output terminal of the power, the power is a constant volt power which has short circuit protection function, the switch controlling module further comprises a first divider resistor coupled in parallel to the second switch, and a second divider resistor coupled in series to the first divider resistor, the second divider resistor is electrically connected to the second switch, the third switch is turned off when the sampling module outputs low level signal so that the second divider resistor provides threshold voltage for the second switch, a loop is formed between the output terminal of the LED driver so as to reduce the input voltage of the controlling module while the second switch is turned on.

4. The LED driver having short circuit protection as claimed in claim 3, wherein the second switch is N-channel metal oxide semiconductor, the drain terminal and the source terminal of the N-channel metal oxide semiconductor are coupled in parallel across the output ends of the power, the gate terminal of the N-channel metal oxide semiconductor is electrically connected between the first divider resistor and the second divider resistor.

5. The LED driver having short circuit protection as claimed in claim 2, wherein the second switch coupled in series to the anode of the output terminal of the power, the switch controlling module further comprises a current limiting resistor coupled in parallel to the second switch, the third switch is electrically connected to the sampling module and the second switch respectively, the third switch is turned off while it receives low level signal so that the second switch is turned off, the output voltage of the power drops across the current limiting resistor so as to reduce the input voltage of the controlling module since the second switch is turned off.

6. The LED driver having short circuit protection as claimed in claim 5, wherein the second switch is a P-channel metal oxide semiconductor, the drain terminal of the P-channel metal oxide semiconductor is electrically connected to the anode of the output end of the power, the source terminal of the P-channel metal oxide semiconductor is electrically connected to the controlling module, and the gate terminal of the P-channel metal oxide semiconductor is electrically connected to the third switch.

7. The LED driver having short circuit protection as claimed in claim 2, wherein the switch controlling module further comprises a filter capacitor coupled to the third switch and configured to provide regulated threshold voltage, and a discharge resistor coupled in parallel to the filter capacitor and electrically connected to the sampling module.

8. The LED driver having short circuit protection as claimed in claim 1, wherein the sampling module comprises a sampling resistor electrically connected to the first switch.

9. The LED driver having short circuit protection as claimed in claim 8, wherein the sampling module further comprises a diode, the anode of the diode is electrically connected to the first switch, and the anthode of the diode is electrically connected to the sampling resistor.

10. The LED driver having short circuit protection as claimed in claim 1, wherein the third switch is a metal oxide semiconductor or a triode.

\* \* \* \* \*